(12) United States Patent
Yokoyama (10) Patent No.: US 9,021,286 B2
(45) Date of Patent: Apr. 28, 2015

(54) INFORMATION PROCESSING DEVICE EMPLOYING MAIN CONTROLLER TO RESPOND WITH ALL RECEIVED PREDETERMINED DATA PACKETS WHEN THE MAIN CONTROLLER IS ALREADY IN HIGH POWER MODE

(75) Inventor: Atsushi Yokoyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 279 days.

(21) Appl. No.: 13/540,008

(22) Filed: Jul. 2, 2012

(65) Prior Publication Data

US 2013/0031393 A1    Jan. 31, 2013

(30) Foreign Application Priority Data

Jul. 25, 2011    (JP) .................................. 2011-161809

(51) Int. Cl.
*G06F 1/00* (2006.01)
*G06F 1/32* (2006.01)

(52) U.S. Cl.
CPC ............ *G06F 1/3209* (2013.01); *G06F 1/3287* (2013.01)

(58) Field of Classification Search
CPC ........ G06F 1/3228; G06F 1/3203; G06F 1/32
USPC ................................................. 713/323, 320
See application file for complete search history.

(56) References Cited

U.S. PATENT DOCUMENTS

| | | | |
|---|---|---|---|
| 6,629,182 B1 * | 9/2003 | Mizoguchi et al. | 710/303 |
| 6,731,395 B1 * | 5/2004 | Shiohara | 358/1.15 |
| 7,406,611 B2 * | 7/2008 | Takahashi et al. | 713/300 |
| 7,890,784 B2 * | 2/2011 | Katoh | 713/323 |
| 8,261,115 B2 * | 9/2012 | Furukawa | 713/320 |
| 8,368,929 B2 * | 2/2013 | Watanabe | 358/1.15 |
| 8,417,976 B2 * | 4/2013 | Inoue | 713/320 |
| 8,537,859 B2 * | 9/2013 | Traub et al. | 370/473 |
| 8,612,780 B2 * | 12/2013 | Hsin et al. | 713/300 |
| 8,732,494 B2 * | 5/2014 | Niikura | 713/320 |
| 2005/0007628 A1 * | 1/2005 | Yamano et al. | 358/1.15 |
| 2005/0138447 A1 * | 6/2005 | Kobayashi et al. | 713/300 |
| 2006/0010331 A1 * | 1/2006 | Ohara | 713/323 |
| 2006/0100724 A1 * | 5/2006 | Miura et al. | 700/82 |
| 2006/0236143 A1 * | 10/2006 | Kidoguchi | 713/320 |
| 2007/0097424 A1 * | 5/2007 | Mizuno | 358/1.15 |

(Continued)

FOREIGN PATENT DOCUMENTS

JP    2006259906 A  *  9/2006
JP    2009-29102        2/2009

(Continued)

*Primary Examiner* — Thomas Lee
*Assistant Examiner* — Santosh R Poudel
(74) *Attorney, Agent, or Firm* — Oblon, McClelland, Maier & Neustadt, L.L.P.

(57) ABSTRACT

An information processing apparatus includes a control unit to control the apparatus, a power supplying control unit to control power supply and a stop of the power supply to the control unit, a receiving unit to receive data from outside, and a response unit to generate and send first response data with respect to first received data received by the receiving unit while the power supply to the control unit is stopped, when the response unit verifies the first received data are predetermined data capable of being responded to by the response unit. The control unit includes a unit to send an instruction to make the power supplying control unit stop the power supply to the control unit, in a predetermined condition while the power is supplied to the control unit.

3 Claims, 7 Drawing Sheets

(56) References Cited

U.S. PATENT DOCUMENTS

| | | | |
|---|---|---|---|
| 2007/0254654 A1* | 11/2007 | Kanagala et al. | 455/435.1 |
| 2008/0056742 A1* | 3/2008 | Hattori et al. | 399/44 |
| 2008/0189563 A1* | 8/2008 | Itkin | 713/300 |
| 2008/0195688 A1 | 8/2008 | Watanabe | |
| 2009/0013200 A1* | 1/2009 | Niikura | 713/320 |
| 2009/0125739 A1* | 5/2009 | Satoh | 713/322 |
| 2009/0164816 A1 | 6/2009 | Yasuda | |
| 2009/0177896 A1* | 7/2009 | Ito et al. | 713/300 |
| 2009/0259868 A1* | 10/2009 | Katoh | 713/324 |
| 2009/0282278 A1 | 11/2009 | Satoh | |
| 2009/0287855 A1* | 11/2009 | Nomura | 710/19 |
| 2010/0070642 A1* | 3/2010 | Bansal et al. | 709/230 |
| 2010/0185886 A1* | 7/2010 | Mitarai | 713/323 |
| 2010/0235619 A1* | 9/2010 | Inoue | 713/151 |
| 2010/0250978 A1* | 9/2010 | Nakamura | 713/300 |
| 2010/0293400 A1* | 11/2010 | Kuroishi et al. | 713/310 |
| 2011/0040992 A1* | 2/2011 | Mizunashi | 713/310 |
| 2011/0131436 A1* | 6/2011 | Ogashiwa | 713/323 |
| 2011/0138201 A1* | 6/2011 | Park | 713/310 |
| 2011/0188075 A1* | 8/2011 | Narushima et al. | 358/1.15 |
| 2011/0191614 A1* | 8/2011 | Tsuzuki | 713/320 |
| 2011/0276813 A1* | 11/2011 | Kamijima | 713/320 |
| 2012/0054479 A1* | 3/2012 | Park | 713/2 |
| 2012/0127537 A1* | 5/2012 | Takeuchi | 358/442 |
| 2014/0078540 A1* | 3/2014 | Ishida | 358/1.13 |

FOREIGN PATENT DOCUMENTS

| | | |
|---|---|---|
| JP | 2009-151537 | 7/2009 |
| JP | 2009-266088 | 11/2009 |
| JP | 2009-294927 | 12/2009 |
| JP | 2010-74256 | 4/2010 |
| WO | WO2006/043436 | 4/2006 |

* cited by examiner

INFORMATION PROCESSING DEVICE EMPLOYING MAIN CONTROLLER TO RESPOND WITH ALL RECEIVED PREDETERMINED DATA PACKETS WHEN THE MAIN CONTROLLER IS ALREADY IN HIGH POWER MODE

BACKGROUND OF THE INVENTION

1. Field of the Invention

The present invention relates to an information processing apparatus, an information processing method and a recording medium containing a program including a facsimile apparatus, a scanner apparatus, a printer, a copier, a combined apparatus having at least two of these functions together, and a personal computer.

2. Description of the Related Art

As a network device, an information processing apparatus including a facsimile apparatus, a printer, a copier, a combined apparatus and a personal computer is frequently utilized.

Some of the above-mentioned information processing apparatuses may have a function of shifting into a power saving mode if the information processing apparatus does not receive a packet to be processed by itself through a network for a certain period of time.

Moreover, there exists an information processing apparatus that has a function of responding only to a limited packet such as a regular query packet from a personal computer (which may be expressed as a "PC" hereinafter) through a network in a power saving mode (which is called an "automatic answering function").

Supplying electricity to a functional part that performs the automatic answering function is maintained even in the power saving mode where power supply to a main part is stopped.

Conventionally, in order to maintain the power saving mode, there is an information processing apparatus that determines whether processing is necessary for a packet if the information processing apparatus receives the packet during the power saving mode, and generates and sends back a response packet if the processing is not needed, keeping the power saving mode, as disclosed in Japanese Laid-open Patent Application Publication No. 2009-29102 (which is hereinafter called Patent Document 1).

Furthermore, in order to maintain the power saving mode, there is an information processing apparatus that determines whether a packet can be answered automatically, and generates and sends back a response packet, keeping the power saving mode, as disclosed in Japanese Laid-open Patent Application Publication No. 2009-151537 (which is hereinafter called Patent Document 2).

However, in the above-mentioned conventional information processing apparatus, for example, if the information processing apparatus is configured as an image forming apparatus, the image forming apparatus frequently receives the regular query packets from the personal computers in an environment where a print function is shared by multiple people.

In such a case, though some of the query packets can be responded to by the automatic answering function alone, the image forming apparatus cannot often shift from a normal mode into the power saving mode.

SUMMARY OF THE INVENTION

Accordingly, embodiments of the present invention may provide a novel and useful information processing apparatus, information processing method and recording medium containing a program solving or reducing one or more of the above-described problems.

More specifically, the embodiments of the present invention may provide an information processing apparatus, an information processing method and a recording medium for a program to be able to move into a power saving state even in an environment that frequently receives data capable of being answered automatically.

According to one embodiment of the present invention, an information processing apparatus is provided, the apparatus including:

a control unit to control the apparatus;

a power supplying control unit to control power supply and a stop of the power supply to the control unit;

a receiving unit to receive data from outside; and a response unit to generate and send first response data with respect to first received data received by the receiving unit while the power supply to the control unit is stopped, when the response unit verifies the first received data are predetermined data capable of being responded to by the response unit, wherein the control unit includes a unit to send an instruction to make the power supplying control unit stop the power supply to the control unit, in a predetermined condition while the power is supplied to the control unit.

According to another embodiment of the present invention, an information processing method using an information processing apparatus is provided, the method including the steps of:

(A) controlling power supply and a stop of the power supply to a control unit for controlling the apparatus;

(B) receiving data from outside;

(C) generating and sending response data with respect to first received data received in step (B) while the power supply to the control unit is stopped, when the first received data are verified to be predetermined data capable of being responded to; and (D) sending an instruction to stop the power supply to the control unit by step (A), in a predetermined condition while the power is supplied to the control unit.

According to another embodiment of the present invention, a non-transitory computer readable medium contains a computer program able to cause an information processing apparatus including a control unit to execute a process to perform the steps of:

(A) controlling power supply and a stop of the power supply to a control unit for controlling the apparatus;

(B) receiving data from outside;

(C) generating and sending response data with respect to first received data received in step (B) while the power supply to the control unit is stopped, when the first received data are verified to be predetermined data capable of being responded to; and (D) sending an instruction to stop the power supply to the control unit by step (A), in a predetermined condition while the power is supplied to the control unit.

Other objects, features and advantages of the present invention will become more apparent from the following detailed description when read in conjunction with the accompanying drawings.

DETAILED DESCRIPTION OF THE PREFERRED EMBODIMENTS

Figure 4:
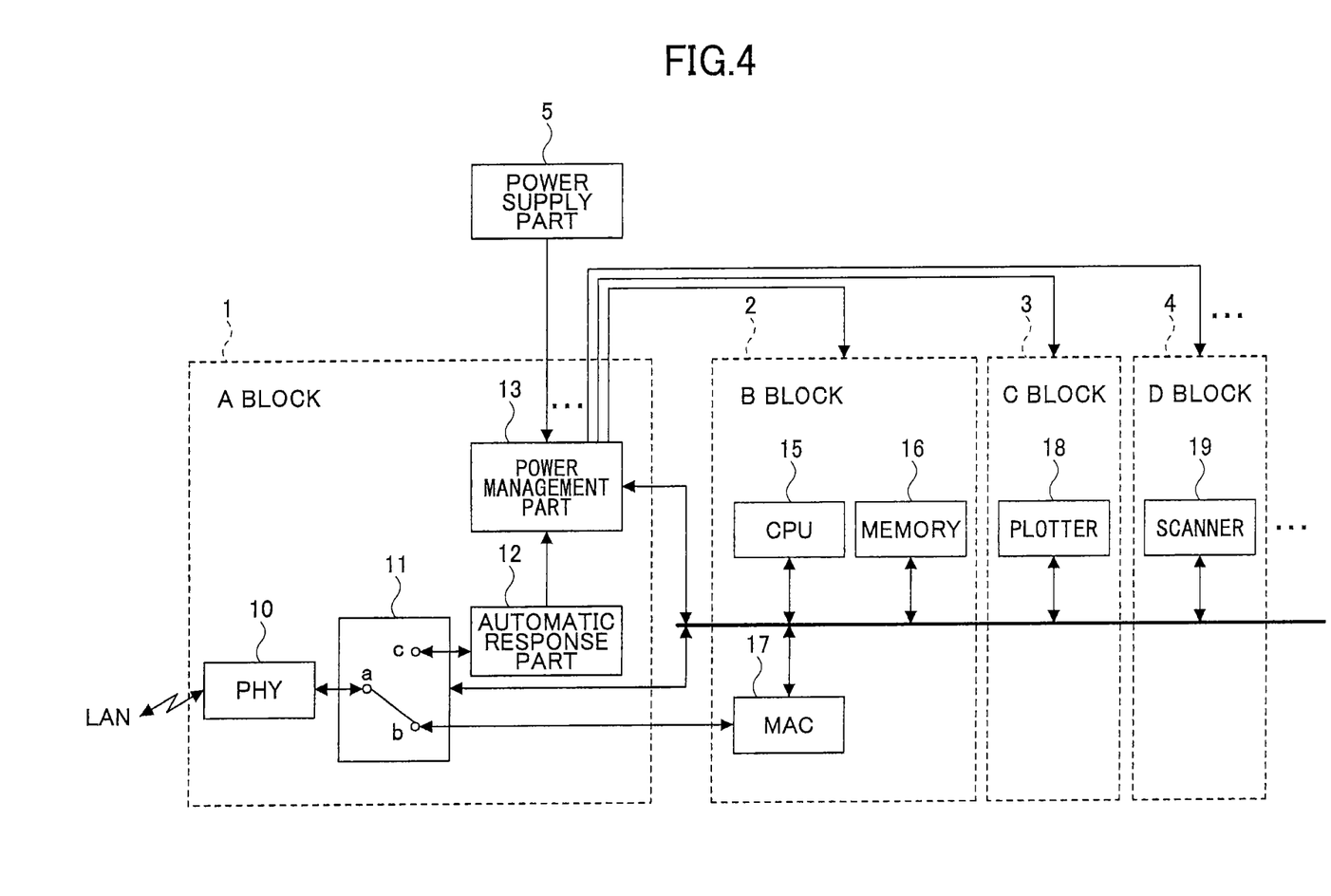
FIG. 4 is a block diagram showing a main functional configuration of an image forming apparatus according to an embodiment of the present invention.

A description is given, with reference to the accompanying drawings, of embodiments of the present invention. FIG. 4 is a block diagram showing a main functional configuration of an image forming apparatus of an embodiment of the present invention. The image forming apparatus shown in FIG. 4 corresponds to an information processing apparatus, and includes functional parts including an A block 1, a B block 2, a C block 3 and a D block 4 in a power supply segment unit. A power supply part 5 is a power source or a storage battery connected to a commercial power source, and supplies electricity to the image forming apparatus.

The A block 1 includes a physical layer part (which may be expressed as a "PHY" hereinafter) 10, a selector 11, an automatic response part 12, and a power management part 13. The PHY 10 is connected to a local area network (which may be expressed as a "LAN" hereinafter), and sends and receives packet data with a PC or another image forming apparatus on the LAN. Therefore, the PHY 10 functions as a receiver or a receiving unit to receives packet data, and as a transmitter or a sending unit to send response data. The selector 11 switches a flow of the packet data (which may be abbreviated as "packets" hereinafter) that the PHY 10 receives.

In a mode where electricity is supplied to the B block 2, a terminal a is switched to be connected to a terminal b, and the packet received by the PHY 10 is output to a MAC 17. Moreover, in a mode where power supply to the B block is stopped and an automatic answering function is executed in the A block 1, the terminal a is switched to be connected to a terminal c, and the packet received by the PHY 10 is output to the automatic answering part 12. The power management part 13 performs this switching control.

The automatic response part 12, in a power saving mode where the power supply to the block B 2 is stopped, carries out pattern matching of the packet received by the PHY 10, and determines whether the packet is capable of being answered automatically. Then, if the automatic response part 12 determines that the packet is capable of being responded to automatically, the automatic response part 12 generates a response packet with respect to the received packet and sends back the response packet to the original packet sender through the selector 11. Furthermore, if the automatic response part 12 determines that the received packet is not capable of being responded to automatically, the automatic response part 12 requests the power management part 13 to supply electricity to the B block 2.

This automatic response part 12 is a functional part to implement a response function that generates and sends response data with respect to the received data if the data that a control unit has received in a power supply stopped state are identified to be predetermined data capable of being responded to, by performing processing of a response procedure that generates and sends the response data with respect to the received data if the data that the control unit has received in the power supply stopped state are identified to be the predetermined data capable of being responded to. In other words, the automatic response part 12, if the data that the control unit has received in the power supply stopped state are identified to be the predetermined data capable of being responded to, functions as a response unit that generates and sends the response data with respect to the received data.

The power management part 13 is connected to the power supply part 5, and performs power management of power supply and stopping the power supply to the respective blocks including the A block to D block of the image forming apparatus. This power management part 13 is a functional part to implement a power supplying control function to control power supply and a stop of the power supply by performing processing of the power supplying control procedure that controls the power supply and the stop of the power supply to the control unit that controls the entire apparatus. In other words, the power management part 13 functions as a power supplying control unit that controls the power supply and the stop of the power supply to the control unit.

The B block 2 includes a CPU 15, a memory 16, and a media access control part (which may be expressed as a "MAC" hereinafter) 17. The CPU 15 governs control of the entirety of this image forming apparatus by executing a program stored in the memory 16. This B block 2 functions as a control unit to control the entire image forming apparatus.

The memory 16 is a memory part including a ROM and a RAM, and stores a program that the CPU 15 executes. In addition, the memory 16 provides a working area where the CPU 15 accesses data to implement various control processes. The MAC 17 receives the packets received by the PHY 10 through the selector 11.

Moreover, the MAC 17 performs transmitting and receiving control and/or error detection of a frame of the received packets. The C block 3 includes a plotter 18. The plotter 18 is a printing part, and prints when a print function and a copy function are carried out by control of the CPU 15.

The D block 4 includes a scanner 19. The scanner 19 is an image reading part, and optically reads an image of a draft or a manuscript when an image reading function and a copy function is implemented by control of the CPU 15. Furthermore, though not shown in the drawings, the image forming apparatus of this embodiment includes a functional part block that performs facsimile communication, an automatic draft feeding device (which may be expressed as an "ADF") block, or other respective blocks including a paper conveyance mechanism block. Then in the image forming apparatus of this embodiment, the power management part 13 performs control of power supply and cutoff of the power supply to those respective blocks according to various power saving modes.

The image forming apparatus of this embodiment, if the electricity is supplied to the B block 2, for example, is in a normal mode, the power management part 13 switches the selector 11 so that the terminal a is connected to the terminal b. Accordingly, the PHY 10 outputs the packets to the MAC 17 when receiving the packets from the LAN. In addition, among the power saving modes, where the power supply to the B block 2 is stopped, the power management part 13 switches the selector 11 so that the terminal a is connected to the terminal c. Therefore, the PHY 10 outputs the packets to the automatic response part 12 if receiving the packets from the LAN.

Figure 3:
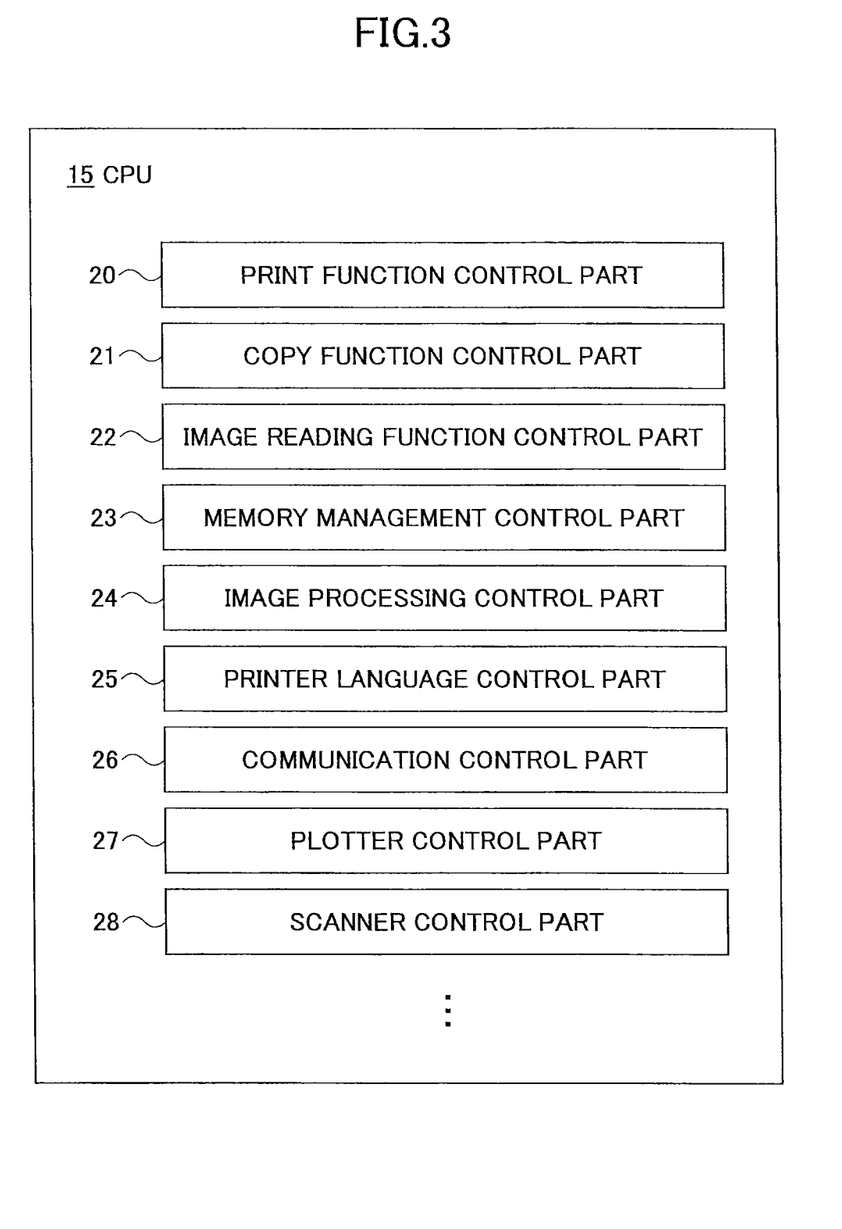
FIG. 3 is a functional diagram showing a main functional part of a CPU shown in FIG. 4.

Next, a description is given about a main functional part of the CPU 15 in this embodiment. FIG. 3 is a functional block diagram showing a main functional part of the CPU 15 shown in FIG. 4. The following respective parts are a functional part implemented by allowing the CPU 15 to run the program of memory 16. A print function control part 20 performs control relating to a print function using the plotter 18 shown in FIG. 4. A copy function control part 21 carries out control relating to a copy (i.e., duplicate) function using the plotter 18 and the scanner 19 shown in FIG. 4.

An image reading function control part 22 executes control relating to an image reading function utilizing the scanner 19 shown in FIG. 4. A memory management control part 23 manages the memory 16 shown in FIG. 4. An image processing control part 24 performs various image processing necessary for respective functions including a print function, a copy function and a facsimile communication function. This image processing includes data conversions to various compressed data including TIFF (i.e., Tagged Image File Format) and JPEG (i.e., Joint Photographic Experts Group).

A printer language control part 25 is a printer application that analyzes printer job data of packets received from a communication control part 26, and creates a picture to be printed by the plotter 18 in FIG. 4. The communication control part 26 performs various processing including communication control through the MAC 17 in FIG. 4. A plotter control part 27 carries out motion control of the plotter 18 of FIG. 4. A scanner control part 28 performs motion control of the scanner 19 of FIG. 4.

Figure 1:
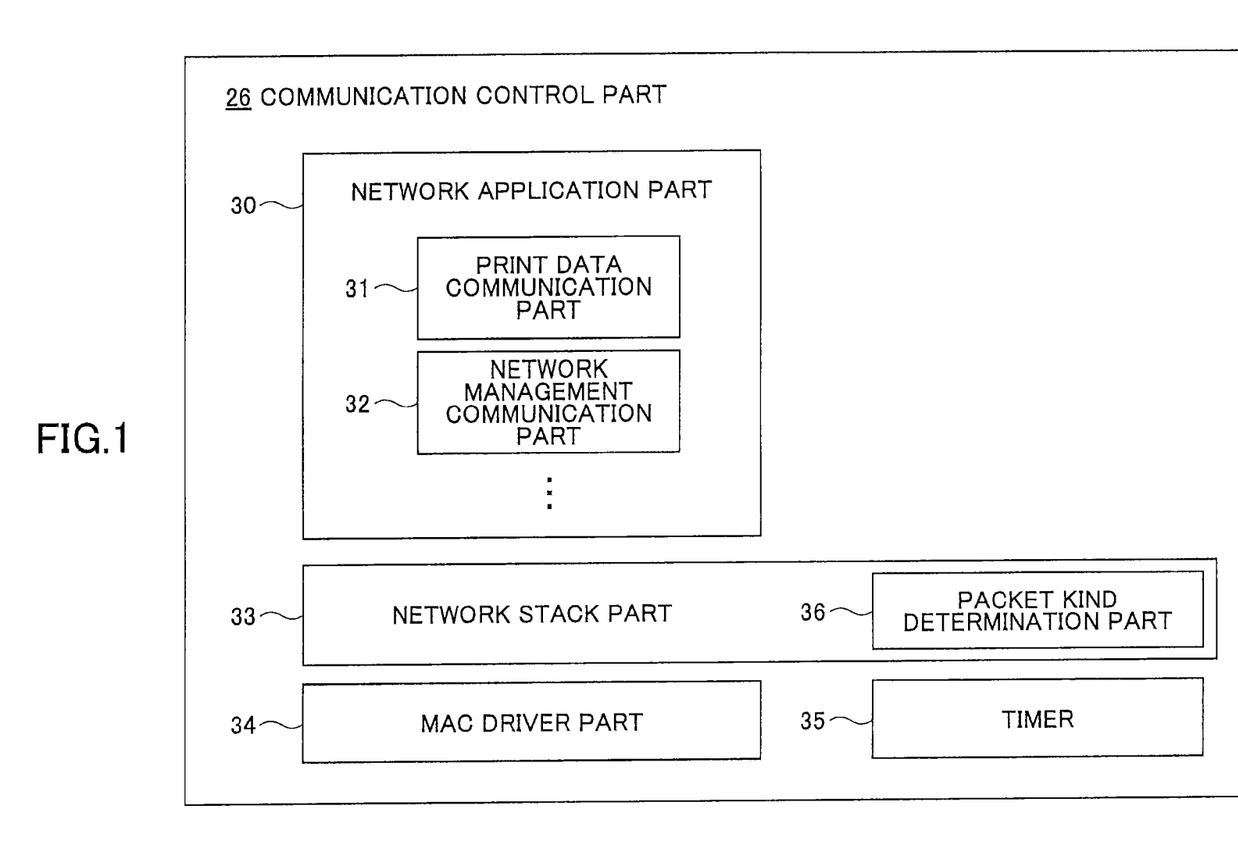
FIG. 1 is a functional block diagram showing a configuration example of a main functional part of the inside of a communication control part shown in FIG. 3.

Next, a description is given about main functional parts of the above-mentioned communication control part 26 in this embodiment. FIG. 1 is a functional block diagram showing a configuration example of main functional parts of the inside of the communication control part 26 shown in FIG. 3. The communication control part 26 includes a network application part 30, a network stack part 33, a MAC driver part 34, a timer 35, and a packet kind determination part 36.

The network application part 30 performs network control for respective functions including the print function and the scanner function. For example, the network application part 30 includes a print data communication part 31 and a network management communication part 32. The print data communication part 31 includes a port 9100 that receives print data from a PC and gives the data to the printer language control part 25 that is a printer application. This port means an interface of software or hardware to input data from the outside and output data to the outside.

Moreover, there is an LPD protocol (i.e., Line Printer Daemon Protocol) that receives print data from a PC and gives the data to the printer language control part 25 that is a printer application in accordance with the procedure specified in RFC (i.e., Request For Comment) 1179.

The above-mentioned RFC is a specification specified by the IETF (Internet Engineering Task Force) that is an organization that determines the standards of technology related to the Internet. For example, there are various technology specifications related to protocols used by the Internet such as IP (RFC791), TCP(RFC793), HTTP(RFC2616), FTP(RFC959) and others involved in the Internet. In addition, the above-mentioned LPD protocol is a kind of protocol that is connected to a network printer.

The network management communication part 32 governs communication for management of devices on the LAN. For example, there is a SNMP (i.e., Simple Network Management Protocol) that is used for monitoring such as getting a status of a network device. The SNMP is a functional part based on the protocol (i.e., communication protocol) specified for network management. The SNMP is to monitor or control a router connected to the LAN and a communication device including a hub through the LAN.

Here, the SNMP is often used for a network of the TCP/IP (i.e., Transmission Control Protocol/Internet Protocol) connection, but sometimes used on the UDP (i.e., User Datagram Protocol), not on the TCP. The communication device that is monitored and/or controlled is managed by a database that is called MIB (i.e., Management Information Base). Then, according to the specification of the MIB, setting management of the device can be performed such as checking a utilization situation of a modem or resetting the setting. The network stack part 33 controls an IP layer and a transport layer (which is not shown in the drawing). Because this is well known, a detailed description is omitted.

The MAC driver part 34 controls the MAC 17. Since this is also well known, a detailed description is omitted. The timer 35 counts a count value of a time. The count value of the timer 35 is operated by the packet kind determination part 36. The packet kind determination part 36 determines whether the packet received by the MAC 17 in FIG. 4 is a kind for being processed by the network management communication part 32, or a kind for being processed by the network stack part 33.

Moreover, the packet kind determination part 36 determines whether the packet received by the MAC 17 in FIG. 4 is a kind of packet capable of being automatically responded to by the A block. This communication control part 26, after generating and sending response data to data that the B block 2 has received in a power supply state, if verifying that the received data is data capable of being responded to by the A block 1, executes processing of a procedure for sending an instruction to make the power management part 13 stop supplying power to the B block.

By performing the processing, after generating and sending the response data to the data received by the B block 2 in the power supply state, if the received data is verified to be the data capable of being responded to by the A block 1, a function of sending an instruction to make the power management part 13 stop supplying the power to the B block 2 is fulfilled. In other words, the communication control part 26, after generating and sending the response data with respect to the data received by the B block 2 in the power supply state, if the received data are identified to be the data capable of being responded to by the A block 1, functions as a unit to send the instruction to make the power management part 13 stop supplying the power to the B block 2.

In addition, the communication control part 26, if verifying that the data incapable of being responded to by the A block 1 has not been received for a certain period of time when the B block 2 is in a power supply state, implements processing of a procedure to send an instruction to make the power management part 13 stop supplying electricity to the B block 2. By performing the processing, if it is verified that the data incapable of being responded to by the A block 1 has not been received for a certain period of time when the B block 2 is in a power dispatching state, the function of sending an instruction to make the power management part 13 stop supplying electricity to the B block 2 is achieved.

In other words, the communication control part 26, if verifying that the data incapable of being responded to by the A block 1 has not been received for a certain period of time when the B block 2 is in a power supply state, functions as a unit to send the instruction to make the power management part 13 stop supplying electricity to the B block 2. Furthermore, the communication control part 26, while verifying that the data incapable of being responded to by the A block 1 has not been received for a certain period of time, implements processing of a procedure to continue time measurement of the certain period of time even if data capable of being responded to by the block A 1 are received.

Performing the processing, while identifying that the data incapable of being responded to by the A block 1 has not been received for a certain period of time, functions to continue time measurement of a certain period of time even if data capable of being responded to by the block A 1 is received. In other words, the communication control part 26, while identifying that the data incapable of being responded to by the A block 1 has not been received for a certain period of time, functions as a unit to continue time measurement of a certain period of time even if data capable of being responded to by the block A 1 is received.

Furthermore, the communication control unit 26, while verifying that the data incapable of being responded to by the A block 1 has not been received for a certain period of time, if receiving predetermined kind of data capable of being responded to by the block A, executes a procedure to make the power management part 13 stop supplying power to the B block 2.

By performing the processing, while verifying that the data incapable of being responded to by the A block 1 has not been received for a certain period of time, if receiving predetermined kind of data capable of being responded to by the block A, a function of sending an instruction to make the power management part 13 stop supplying the power to the B block 2 is fulfilled.

That is to say, the communication control part 26, while verifying that the data incapable of being responded to by the A block 1 has not been received for the certain period of time, if receiving predetermined kind of data capable of being responded to by the block A, functions as a unit to send the instruction to make the power management part 13 stop supplying electricity to the B block 2.

Figure 2:
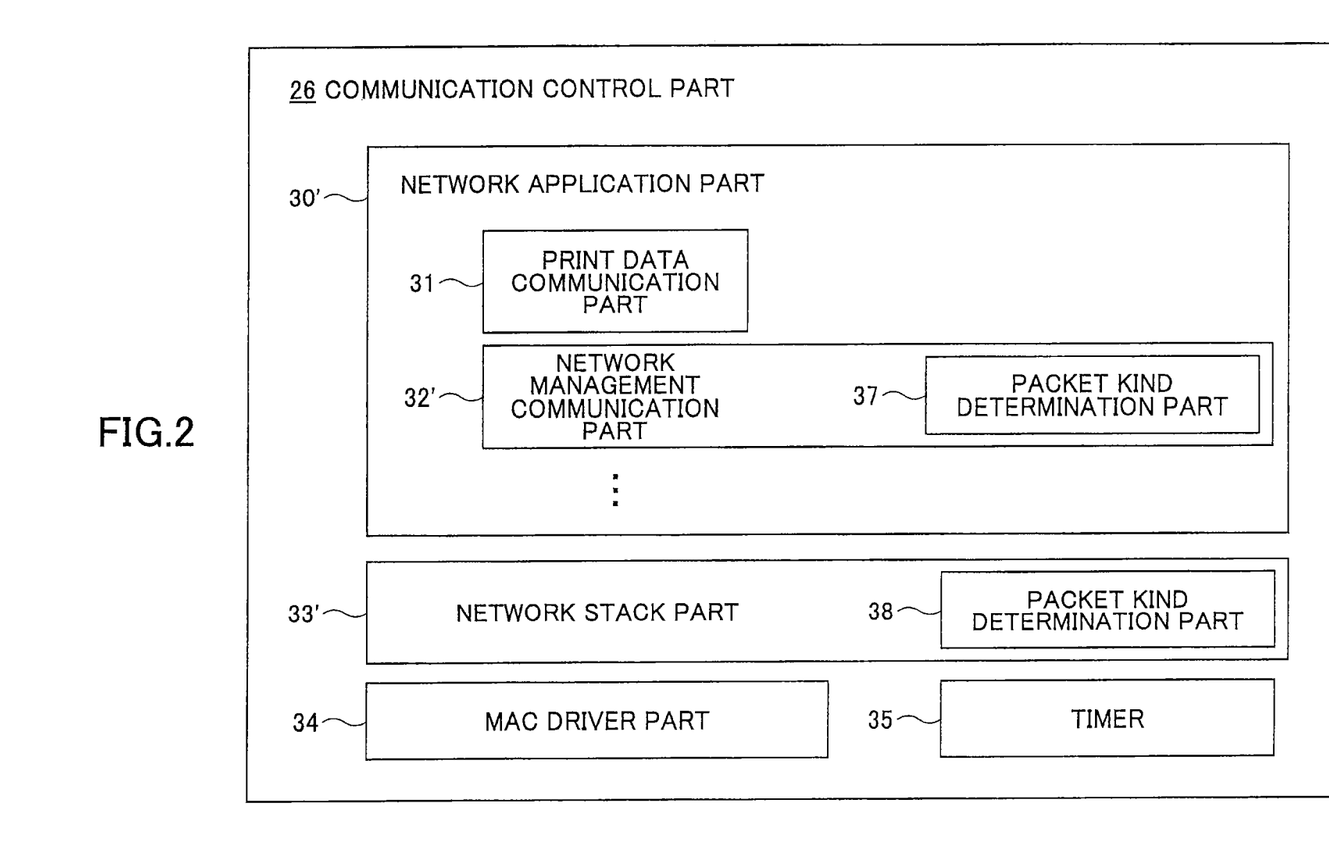
FIG. 2 is a functional block diagram showing another configuration example of a main functional part of the inside of the communication control part shown in FIG. 3.

In an inside configuration example shown in FIG. 1, a case is shown where the packet kind determination unit 36 is provided independent of other inside functional parts. However, as shown in FIG. 2, a packet kind determination unit 37 may be provided inside a network management communication part 32' of a network application part 30', and a packet kind determination part 38 may be provided inside a network stack part 33' respectively. The network application part 30' fulfills the same functions as the above-mentioned network application part 30 except including the packet kind determination part 37 inside.

Moreover, the network stack part 33' fulfills the same functions as the above-mentioned network stack part 33 except including the packet kind determination unit 38 inside. In this configuration example case, the packet kind determination part 37 determines whether the packet received by the MAC 17 in FIG. 4 is a kind of a packet that the network management part 32' processes. Furthermore, the packet kind determination part 38 determines whether the packet received by the MAC 17 in FIG. 4 is a kind of packet that the network stack part 33' processes.

Figure 5:
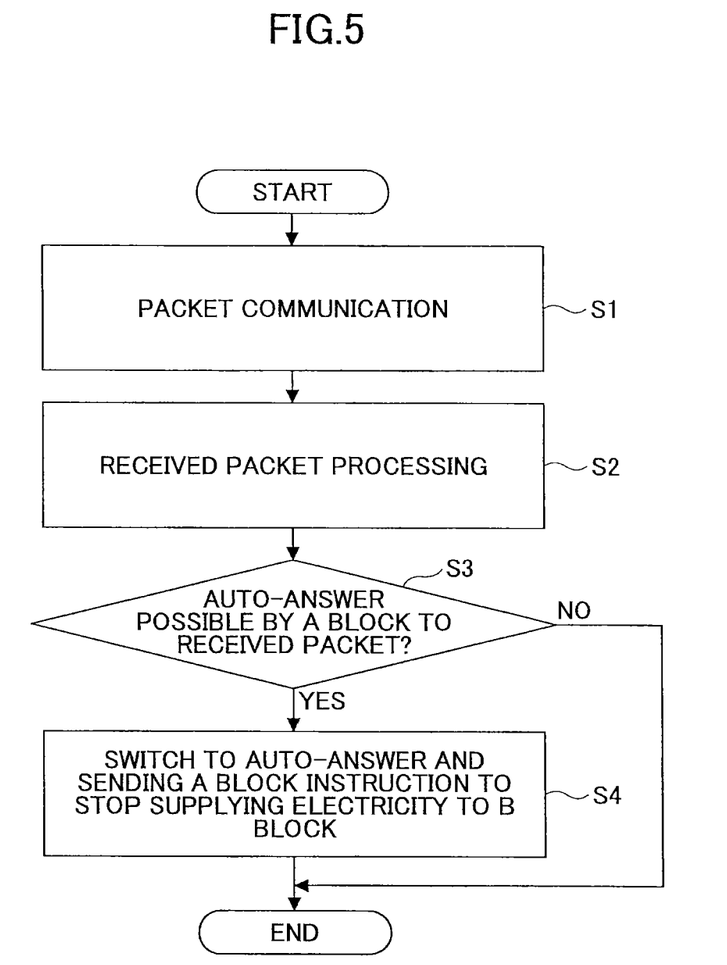
FIG. 5 is a flowchart showing processing that the communication control part shown in FIG. 3 executes in a state of supplying electricity to a B block shown in FIG. 4.

Next, a description is given about processing that the communication control part 26 performs in a state where electricity is supplied to the B block. FIG. 5 is a flowchart showing processing that the communication control part 26 executes in a state where electricity is supplied to the B block 2. The B block 2 is in a state where electricity is supplied from the power source part 5. For example, the B block is in a normal mode. In step S1, in the communication control part 26 in FIG. 1, the MAC driver part 34 receives a packet from the MAC 17 in FIG. 4.

In step S2, received packet processing is performed. In the received packet processing, a kind of packet that the packet kind determination part 36 has received is determined. Depending on the determined packet kind, the network application part 30 or the network stack part 33 in FIG. 1 processes the received packet. In addition, if necessary, the network application part 30 or the network stack part 33 generates a response packet and sends the response packet for response by way of the MAC driver part 34.

In step S3, it is determined whether the received packet can be responded to automatically (the packet capable of being responded to is determined in advance) by the block A 1 in FIG. 4. By the processing in step S3, after the response data with respect to the received data in a power supply state is generated and sent, verifying that the received data is the data that can be responded to by the A block 1 is possible.

In step S3, if it is determined that the automatic response is possible by the A block 1 in FIG. 4, the process switches into the automatic response in step S4, and an instruction to stop supplying electricity to the B block 2 in FIG. 4 is sent to the power management part 13. Then, this process is finished. The power management part 13 in FIG. 4 switches the selector 11 so as to connect the terminal A to the terminal C.

After that, the power supply from the power supply part 5 to the B block 2 is stopped, and the B block 2 goes into the power saving mode. Also, stopping the power supply to other blocks including the C block 3 and the D block 4 may be better. In this way, if the packet capable of being responded to automatically by the A block 1 is received while the power is supplied to the B block 2 in FIG. 4, moving into the power saving mode that stops the power supply to the B block 2 after the response is possible.

In other words, the image forming apparatus can move from the normal mode to the power saving mode even in an environment that frequently receives regular query packets from a PC on the LAN. Accordingly, the power saving effect in the image forming apparatus can be improved. On the other hand, in step S3, if it is determined that the automatic response by the A block 1 in FIG. 4 cannot be performed with respect to the received packet (incapable of automatic response), this process is finished. Here, in a case of the inside configuration of the communication control part 26 shown in FIG. 2, the above-mentioned process of step S2 may be performed by any of the packet kind determination parts 37, 38 in FIG. 2.

Figure 6:
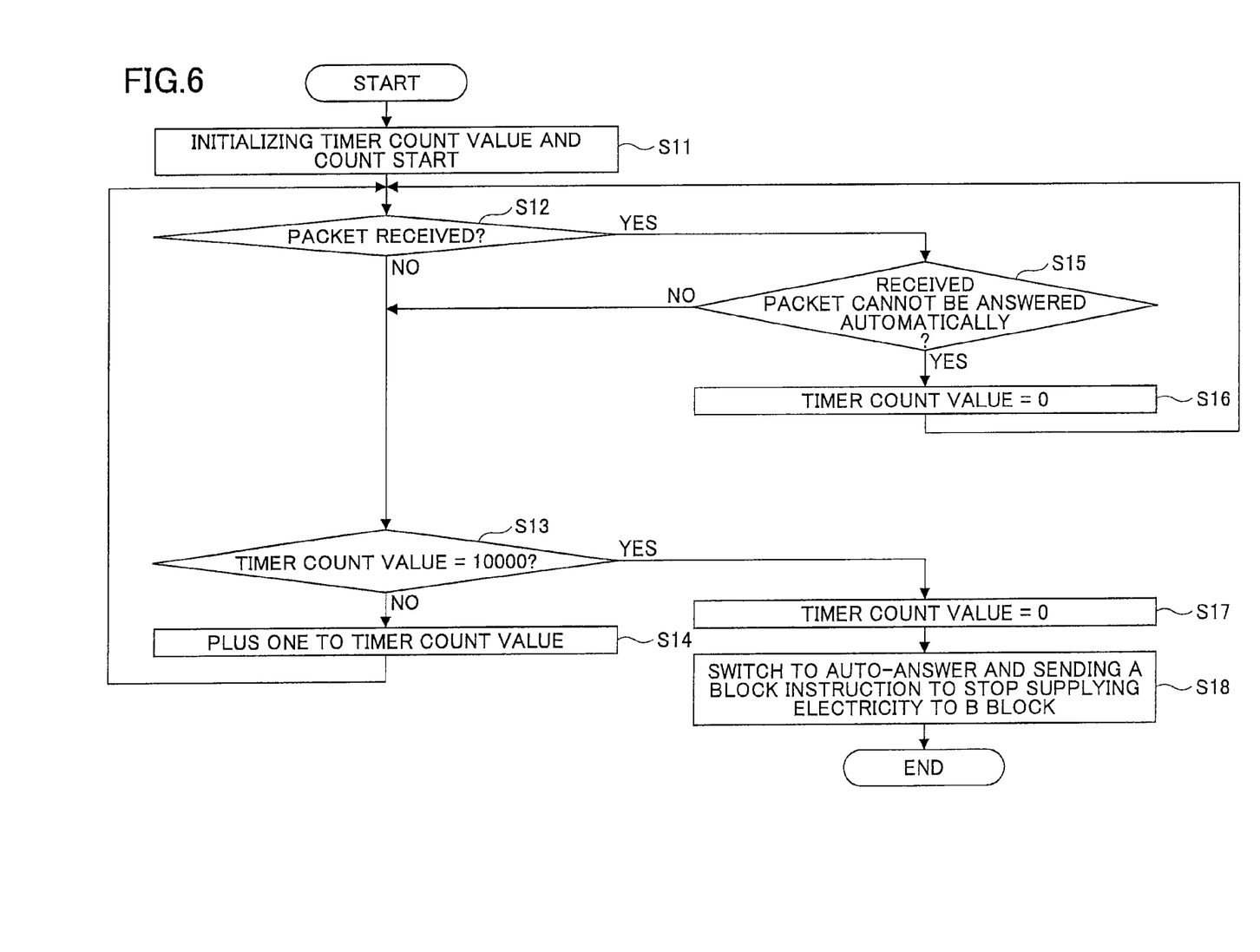
FIG. 6 is a flowchart showing another processing that the communication control part shown in FIG. 3 executes in a state where electricity is supplied to the B block shown in FIG. 4.

Next, a description is given about another processing that the communication control part 26 implements in a state where the electricity is supplied to the B block 2. FIG. 6 is a flowchart showing another processing that the communication control part 26 executes in a state where the electricity is supplied to the B block 2. The B block 2 is in a state where the electricity is supplied from the power supply part 5. For example, the mode is in a normal mode.

In step S11, the communication control part 26 in FIG. 1 initializes (i.e., sets in zero) a count value of the timer 35 of FIG. 1, and starts to count the time. In step S12, the communication control part 26 determines whether the MAC driver part 34 in FIG. 1 has received a packet. If the communication control part 26 determines that the MAC driver part 34 has received the packet, the process proceeds to step S15. If the communication control part 26 determines that the MAC driver part 34 has not received the packet, the process proceeds to step S13.

In step S13, the communication control part 26 determines whether the count value of the timer 35 equals 10000 (ms: millisecond). In other words, it is determined whether ten seconds is counted by the timer 35. That the count value equals 10000 corresponds to a certain period of time set in advance. Before counting the certain period of time, if the packet incapable of being responded to automatically in the A block 1 is not received, it can be verified that the packet needed to be processed in the B block 2 in FIG. 4 has not been received for the certain period of time. The value of the certain period of time can be set at another value in accordance with a user's request.

In step S13, if it is determined that the count value equals 10000, the process advances to step S17. Otherwise, if it is determined that the count value does not equal 10000, the process proceeds to step S14. In step S14, one is added to the count value of the timer 35. After that, the process returns to step S12, and counting of the timer 35 is continued. The processing in steps S11-S14 corresponds to processing of verifying that the communication control part 26 has not received the data incapable of being responded to automatically by the block A 1 for the certain period of time. In step S15, it is determined whether the received packet cannot be responded to automatically.

In other words, in the determining processing of step S15, it is determined whether the received packet is incapable of being responded to automatically by the block A 1 in FIG. 4. In a case of the packet incapable of being responded to automatically, processing has to be performed in the B block 2. Among the packets incapable of being responded to automatically, for example, there is a packet of print data caused by a print request from a PC on the LAN and the like. In step S15, if it is determined that the received packet cannot be responded to automatically, the process advances to step S16. Otherwise, if it is determined that the received packet can be responded to automatically, the process proceeds to step S13.

In the determination of step S15, while it is verified that the packet incapable of being responded to automatically in the block A 1 in FIG. 4 has not been received for the certain period of time, it is verified that the packet capable of being responded to automatically in the block A in FIG. 4 has been received. Then, while verifying that the packet incapable of being responded to automatically in the A block 1 in FIG. 4 is not received, even if the packet capable of being responded to automatically in the A block in FIG. 4 is received, the process advances to step S13 and continues the measurement of the certain period of time.

On the other hand, in step S15, if it is determined that the received packet cannot be responded to automatically, the count value of the timer 35 is reset at zero in step S16. Then, the process returns to step S12. Moreover, in step S13, if it is determined that the count value of the timer 35 equals 10000, the count value of the timer 35 is reset at zero in step S17. After that, in step S18, the process is switched into the automatic response, and an instruction to stop the power supply is sent to the power management part 13 in the A block 1 in FIG. 4. Then, the process is finished.

The power management part 13 in FIG. 4 switches the selector 11 to connect the terminal a to the terminal c. Then, the power management part 13 stops the power supply from the power supply part 5 to the B block 2 and shifts the mode to the power saving mode. Moreover, stopping the power supply to other blocks including the C block 3 and the D block 4 may be better. Thus, it is verified that the packet that has to be processed in the B block 2 has not been received for a certain period of time, which is ten seconds in this embodiment, during the power supply to the B block 2 in FIG. 4.

If the verification is carried out, the mode can be moved into the power saving mode that stops power supply to the B block 2 in FIG. 4. By performing the above-mentioned processing, the image forming apparatus can moves from the normal mode to the power saving mode even in an environment that frequently receives the regular query packet from a PC on the LAN. Therefore, the power saving effect in the image forming apparatus can be enhanced.

Figure 7:
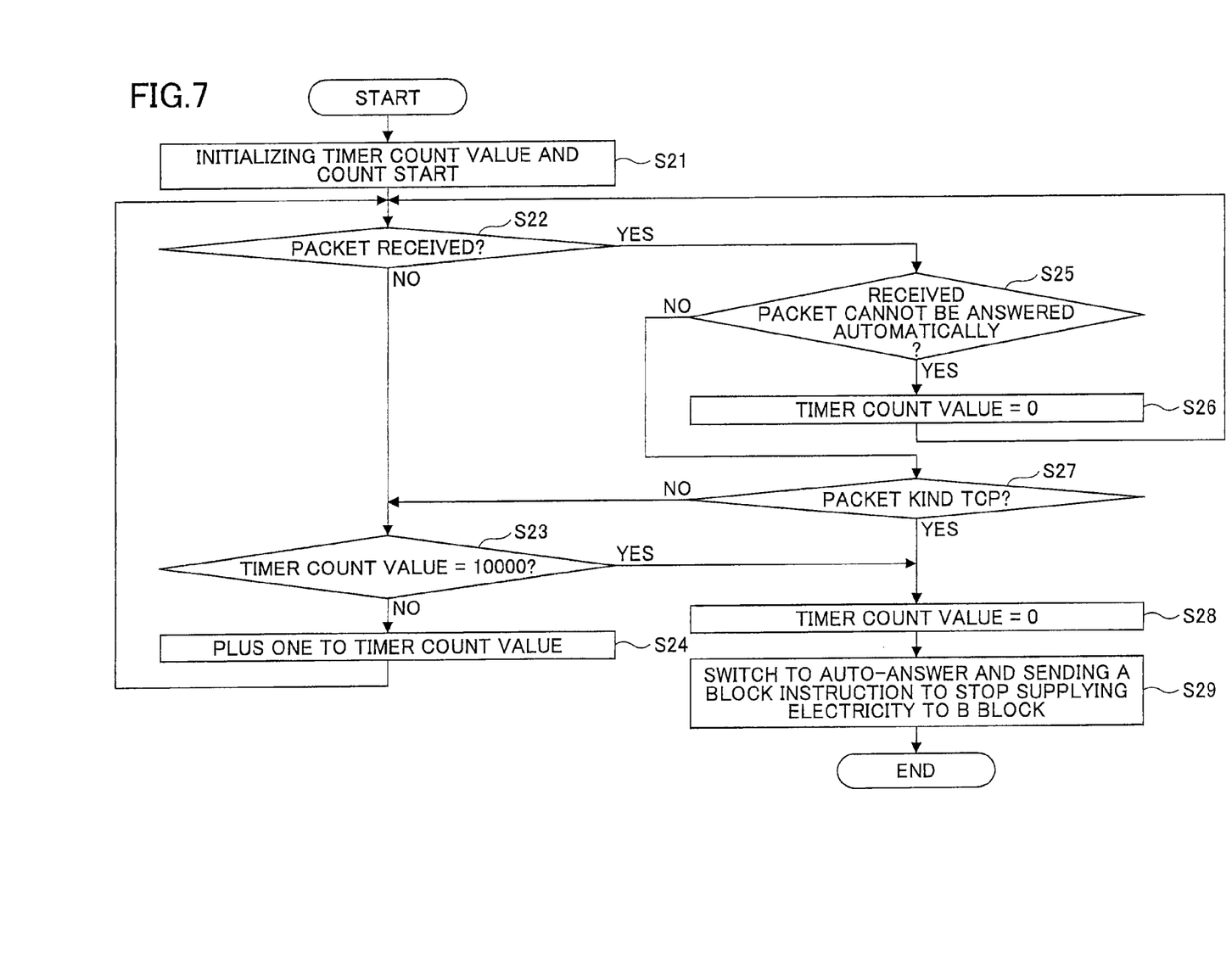
FIG. 7 is a flowchart showing still another processing that the communication control part shown in FIG. 3 executes in a state where electricity is supplied to the B block shown in FIG. 4.

Next, a description is given about another processing that the communication control part 26 implements in a state where the electricity is supplied to the B block. FIG. 7 is a flowchart showing another processing that the communication control part 26 performs in a state where the electricity is supplied to the B block 2. The B block 2 is in a state where the electricity is supplied from the power supply part 5. For example, the mode is in the normal mode. In step S21, the communication control part 26 in FIG. 1 initializes the count value of the timer 35 in FIG. 1 in zero, and starts to count the time.

In step S22, the communication control part 26 determines whether the MAC driver part 34 in FIG. 1 has received a packet. If the communication control part 26 determines that the MAC driver part 34 has received the packet, the process proceeds to step S25. If the communication control part 26 determines that the MAC driver part 34 has not received the packet, the process advances to step S23. In step S23, the communication control part 26 determines whether the count value of the timer 35 equals 10000 ms. If the communication control part 26 determines that the count value of the timer 35 equals 10000 ms, the process advances to step S28. Also, if the communication control part 26 determines that the count value of the timer 35 does not equal 10000 ms, the process proceeds to step S24.

In step S24, one is added to the count value. After that, the process returns to step S22, and counting by the timer 35 is continued. The processing in steps S21-S24 corresponds to the processing where the communication control part 26 verifies that the data incapable of being responded to automatically by the A block 1 in FIG. 4 has not been received for a certain period of time. In step S25, it is determined whether the received packet cannot be responded to automatically.

That is to say, by the determining processing of step S25, it is determined whether the received packet cannot be responded to automatically in the A block 1. Then, if the received packet is a packet incapable of being responded to automatically, the received packet is processed in the B block 2. If it is determined that the received packet cannot be responded to automatically, the process proceeds to step S26. Also, if it is determined that the received packet can be responded to automatically, the process proceeds to step S27. In the determination of step S25, while the communication control part 26 verifies that the packet incapable of being responded to automatically in the A block 1 in FIG. 4 has not been received for a certain period of time, the communication control part 26 verifies that the packet capable of being responded to automatically in the block A 1 in FIG. 4 is received.

There are various kinds of receive packets. For example, because the TCP has a retransmission guarantee, even if the image forming apparatus is powered off and a packet loss occurs, the packet is ensured to be sent again. If the image forming apparatus receives such a kind of packet, the image forming apparatus may move into the power saving mode immediately. Therefore, in step S27, it is determined whether the kind of packet is the TCP. In step S27, if it is determined that the kind of packet is the TCP, the count value of the timer 35 is reset at zero in step S28.

After that, in step S29, the communication control part 26 switches into the automatic answering and sends an instruction to stop supplying the electricity to the B block in FIG. 4 to the power management part 13. Then, the process is finished. Here, in this embodiment, a case of the TCP is described, but other packets having the retransmission guarantee can be operated in a similar way.

The power management part 13 switches the selector 11 to connect the terminal a to the terminal c. Then, the image forming apparatus is moved into the power saving mode by stopping the power supply to the B block 2 from the power source part 5. Moreover, the power supply to other blocks including the C block 3 and the D block 4 may be stopped. In this manner, if the communication control part 26 receives a kind of packet having a retransmission guarantee while the electricity is supplied to the B block 2 in FIG. 4, the image forming apparatus can be moved into the power saving mode that stops supplying the electricity to the B block 2 in FIG. 4 without waiting for a certain period of time.

In other words, the image forming apparatus can transfer from the normal mode into the power saving mode even in an environment of often receiving the regular query packet from a PC on the LAN. Therefore, according to this image forming apparatus, the power saving effect can be improved. On the other hand, in step S27, if the kind of packet is not determined to be the TCP, the process proceeds to step S23.

In this way, while identifying that a packet incapable of being responded to automatically by the A block 1 in FIG. 4 has not been received for a certain period of time, if a packet capable of being responded to automatically by the A block 1 in FIG. 4 is received except for the TCP, the process proceeds to step S23 and the measurement for a certain period of time is continued. If it is determined that the received packet cannot be responded to automatically in step S25, the count value of the timer 35 is reset at zero in step S26.

After that, the process returns to step S22. Then, if it is determined that the count value of the timer 35 equals 10000 in step S23, the count value of the timer 35 is reset at zero in step S28. After that, in step S29, the image forming apparatus is switched into the automatic response and an instruction to stop power supply to the B block 2 in FIG. 4 is sent to the power management part 13 of the A block 1 in FIG. 4. Then, the process is finished.

The power management part 13 in FIG. 4 switches the selector 11 so as to connect the terminal a to the terminal c. Then, supplying electricity from the power supply part 5 to the B block 2 is stopped, and the image forming apparatus is changed into the power saving mode. Moreover, it may be better to supply the electricity to other blocks including the C block 3 and the D block 4. In this manner, while the electricity is supplied to the B block 2 in FIG. 4, if it is determined that a packet that has to be processed in the B block 2 has not been received for a certain period of time, which is ten seconds in this embodiment, the image forming apparatus can shift into the power saving mode that stops supplying electricity to the B block 2 in FIG. 4.

By performing the above-mentioned processing, the image forming apparatus can move from the normal mode into the power saving mode even in an environment where the image forming apparatus frequently receives regular query packets from a PC on the LAN. Therefore, according to the image forming apparatus of this embodiment, enhancing the power saving effect is possible. As discussed above, because the image forming apparatus of this embodiment determines that the image forming apparatus can shift into a low-power mode if the image forming apparatus receives only a packet capable of being responded to automatically, the image forming apparatus can move into the low-power mode even in an environment where the image forming apparatus frequently receives the packet capable of being responded to automatically. Accordingly, a power saving performance can be improved than ever before.

As mentioned above, according to the embodiments of the present invention, it is possible to provide an information processing apparatus and an information processing method that can go into a power saving state even in an environment that frequently receives data capable of being responded to automatically. In addition, a program stored in a recording medium according to the embodiment of the present invention can cause an information processing computer to execute a function of going into a power saving state even in an environment that frequently receives data capable of being responded to automatically.

The present invention is not limited to the specifically disclosed embodiments, and variations and modifications may be made without departing from the scope of the present invention.

The present application is based on Japanese Priority Patent Application No. 2011-161809, filed on Jul. 25, 2011, the entire contents of which are incorporated herein by reference.

What is claimed is:

1. An information processing apparatus comprising:
a controller to control the apparatus;
a power supplying controller to control power supply and a stop of the power supply to the controller;
a receiver to receive data from outside; and
a responder to generate and send first response data with respect to first received data received by the receiver while the power supply to the controller is stopped, when the responder verifies the first received data are predetermined data capable of being responded to by the responder,
wherein the controller is configured to send an instruction to make the power supplying controller stop the power supply to the controller when the controller verifies second received data received by the controller through the receiver are the predetermined data capable of being responded to by the responder, after the controller has generated and sent second response data in response to the second received data received by the receiver while the power is supplied to the controller,
wherein the controller is further configured to send an instruction to make the power supplying controller stop the power supply to the controller when the controller has not received third received data incapable of being responded to by the responder for a certain period of time, and
wherein the controller continues time measurement of the certain period of time while verifying that the controller has not received the third received data incapable of being responded to by the responder for the certain period of time, even though receiving the predetermined data capable of being responded to by the responder.

2. An information processing method using an information processing apparatus, the method comprising the steps of:
(A) controlling power supply and a stop of the power supply to a controller for controlling the apparatus;
(B) receiving, by a receiver, data from outside;

(C) generating and sending, by a responder, response data with respect to first received data received in step (B) while the power supply to the controller is stopped, when the first received data are verified to be predetermined data capable of being responded to; and
(D) sending an instruction to stop the power supply to the controller by step (A), when the controller verifies second received data received by the controller through the receiver are the predetermined data capable of being responded to by the responder, after the controller has generated and sent second response data in response to the second received data received by the receiver while the power is supplied to the controller,
wherein the controller sends an instruction to make the power supplying controller stop the power supply to the controller when the controller has not received third received data incapable of being responded to by the responder for a certain period of time, and
wherein the controller continues time measurement of the certain period of time while verifying that the controller has not received the third received data incapable of being responded to by the responder for the certain period of time, even though receiving the predetermined data capable of being responded to by the responder.

3. A non-transitory computer readable recording medium containing a computer program able to cause an information processing apparatus to perform the steps of:

(A) controlling power supply and a stop of the power supply to a controller for controlling the apparatus;
(B) receiving, by a receiver, data from outside;
(C) generating and sending, by a responder, response data with respect to first received data received in step (B) while the power supply to the controller is stopped, when the first received data are verified to be predetermined data capable of being responded to; and
(D) sending an instruction to stop the power supply to the controller by step (A), when the controller verifies second received data received by the controller through the receiver are the predetermined data capable of being responded to by the responder, after the controller has generated and sent second response data in response to the second received data received by the receiver while the power is supplied to the controller,
wherein the controller sends an instruction to make the power supplying controller stop the power supply to the controller when the controller has not received third received data incapable of being responded to by the responder for a certain period of time, and
wherein the controller continues time measurement of the certain period of time while verifying that the controller has not received the third received data incapable of being responded to by the responder for the certain period of time, even though receiving the predetermined data capable of being responded to by the responder.

* * * * *